June 19, 1956 H. S. THEOBALD 2,750,683
SKILL AND EFFORT TESTING MACHINE
Filed June 28, 1951 6 Sheets-Sheet 1

INVENTOR.
HAROLD S. THEOBALD.
BY
Miles Henninger
ATTORNEY.

June 19, 1956  H. S. THEOBALD  2,750,683
SKILL AND EFFORT TESTING MACHINE
Filed June 28, 1951  6 Sheets-Sheet 2

INVENTOR.
HAROLD S. THEOBALD.
BY
Miles Henninger
ATTORNEY

June 19, 1956  H. S. THEOBALD  2,750,683
SKILL AND EFFORT TESTING MACHINE
Filed June 28, 1951  6 Sheets-Sheet 3

INVENTOR.
HAROLD S. THEOBALD.
BY Miles Henninger
ATTORNEY.

United States Patent Office 2,750,683
Patented June 19, 1956

2,750,683

SKILL AND EFFORT TESTING MACHINE

Harold S. Theobald, Wauwatosa, Wis.

Application June 28, 1951, Serial No. 233,961

18 Claims. (Cl. 35—22)

This invention relates to improvements in devices for determining and scoring both the motor skill of an individual and the effort which may be expended by or the manual ability of that individual.

The present approach to testing of the above qualities is through the medium of a game to avoid, as far as possible, any prejudicial inhibitions the testee may have toward the arts and sciences of testing. A truer picture of the individual's manual ability may thus be obtained.

Modern theories in education and industrial engineering demand that some measurement of the individual's skill and effort factors be obtained to place him in his proper vocation. To obtain an adequate measurement, the test should closely resemble some chain of mental and motor reactions which are common to most individuals being tested. The present game employs a player controlled by the simple standard rules of automobile driving with respect to traffic light signals, starting and stopping of the car and relative speed under certain conditions. Hence, the present machine is applicable to a wide range of persons to be tested.

The machine is also especially useful in schools where classes in safe automobile driving, are held. Where neuromuscular coordination (skill) and mental concentration (efforts per unit of time) are to be improved, the device may be located where it is freely accessible to and operable by persons to be trained. Such testing and training machines are most useful if they are self-scoring so that the machine may be used competitively. The machine may also be put into form of a device for use in amusement arcades by providing it with means by which payment must be made for use of the machine.

If the scores obtained by various individuals are plotted, the scores conform to the bell or Guassian curve and are the combined skill and effort factors of each operator which may then be compared with those of the same ability grouping. Hence, the skill and effort grouping of any number of persons may be properly rated without regard to the sequence in which tests are made.

It is, therefore, one object of the present invention to provide a machine simulating a game, for determining and scoring the motor skill and the effort factors of an operator of the machine.

Another object of the invention is to provide a machine in which the control is reduced to operation of a single lever so that the operator's ability with either hand, may be determined.

Another object of the invention is to provide a skill and effort testing machine in which the effort standard may be readily adjusted for measurement of the skill and effort of each person in a number of ability groups operating the machine, i. e. groups of various ages or mentalities.

A further object of the invention is to provide a machine in which the variable conditions to be observed and obeyed by the operator, may be set in any one of a large number of sequences which are easily changed from time to time.

Another object of the invention is to provide a testing machine in which errors in operation of the machine are indicated to the operator during each run of the machine.

Another object of the invention is to provide a machine in which an operator cannot affect the scoring of either motor skill or effort factors or of the number of errors made in operating the machine.

Another object of the invention is to provide a skill and effort testing machine in which the standard time-effort factor used in the test, is continuously visible to and comparable by the player throughout the test.

Another object of the invention is to provide a machine in which the skill and effort factors of the player are each individually measured at equal values and are integrated and expressed as a single value. By separately measuring the skill and effort factors and comparison thereof with known standards, it is possible to determine the relationship between the skill and effort factors combining to make up the ability of a particular person.

Another object of the invention is to provide a machine in which both the skill and effort of a person may be measured and so scored as to permit comparison of each score with the scores of a group of persons in the same ability range.

Objects and advantages other than those above set forth will be apparent from the following description when read in connection with the accompanying drawings in which:

Fig. 11 is a diagram of electrical circuits energizing lights for indicating varying conditions to be observed by an operator of the machine in controlling the same and for energizing and de-energizing indicators for errors and elapsed time in operating the machine.

One embodiment of the machine employs three lights simulating the usual green, yellow, red traffic signals operating according to a predetermined cycle, and employs figures simulating a motorcycle and its rider to be operated at constant speed as a standard according to which movement of another figure is to be controlled, the second figure simulating an automobile and its driver. The controlled figure is to be raced (for a predetermined distance) against the standard figure subject to obedience by the controlled figure, to the known rules for driving an automobile under traffic signals.

Figure 3:
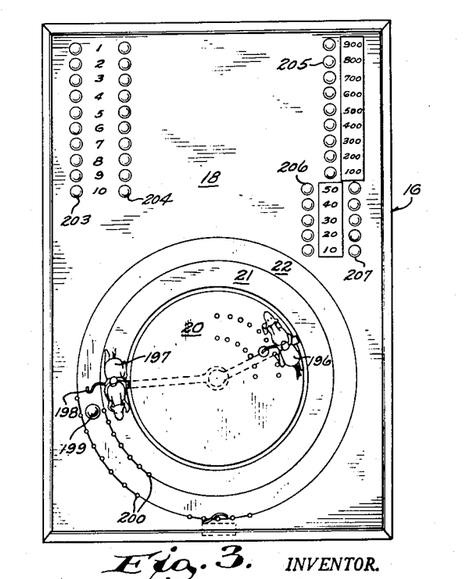
Fig. 3 is a top plan of another embodiment of the invention.

Other embodiments of the invention employ various games, such as polo, which is indicated in Fig. 3, in which one figure moves according to a predetermined standard and another figure is controlled according to the rules of that particular game. In both embodiments of the invention, time (effort), and motor skill of an operator of the machine, are tested and automatically recorded together with a recording of the number of errors made and time elapsed in operating the machine.

Generally, the device comprises a cabinet with a bottom on which the mechanical parts and some of the electrical parts and electrical connections of the device are mounted. An intermediate surface provides a simulated circular track for both the constant speed (or standard) and the controlled (or variable) speed figures. This intermediate surface also serves as a mounting for the varying condition indicators and score and error indicators to be observed by the operator. A transparent top acts as a cover for the parts so that they are visible to the operator. The standard and controllable figures are mounted for movement about a common center in a horizontal plane, the standard figure being driven at a relatively slow speed by an electrical motor and herein sometimes called "cycle" for brevity, while the controllable figure is driven by an electric motor and is operable at a higher speed than that for driving the standard figure, the second figure being sometimes herein called "car" for brevity. Both of the motors drive through frictional drive transmissions so that the jamming of either of the figures will not cause material damage. The relative position of the friction disks which drives the controllable figure, may be varied by the operator at will, and thus secure varying speed operation of such figure from zero speed to a speed several times greater than that of the standard or constant speed figure.

Figure 8:
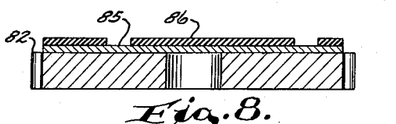
Fig. 8 is an enlarged view of one of the parts of the device shown in Fig. 7.

The mechanical parts employed for supporting and driving both of the figures include a frame mounted on the cabinet bottom and shafts vertically positioned in such frame, the shafts being concentric sleeves centered on the track about which the figures operate. The cycle shaft has a friction disk fixed thereto and resting on the edge of a second friction disk on the shaft of the slow speed motor, and the first disk includes electrically conductive and non-conductive portions as indicated in Fig. 8 herein.

Figure 9:
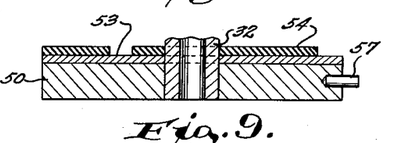
Fig. 9 is an enlarged view of another of the parts of the device shown in Fig. 7.

The car motor acts through speed-reducing means, to drive a disk to be engaged edgewise by a second disk on a shaft mounted for axial movement for varying the relative positions of the disks. Thus a shaft speed variation, over a wide range, can be obtained. The car shaft has a gear fixed thereon to be engaged by a pinion gear on its own shaft. Said first gear also includes electrically conductive and non-conductive portions indicated in Fig. 9 hereof. Power is transmitted to the pinion from the variable speed shaft by way of a sprocket chain drive and a belt drive. Therefore, the parts may be placed as desired and the direction of power flow may be changed from horizontal to vertical plane.

The electrical parts of the device may be divided into a number of circuits. It will be understood that some of the electrical elements are common to several circuits. The device includes (a) circuits for energizing all of the electrically motor driven elements until either figure has passed through a predetermined number of phases of operation (whichever is the first), (b) circuits for cyclically energizing indicators for varying conditions, (c) circuits for indicating penalties for failures of the operator to react to such varying conditions (lack of skill), (d) circuits for comparing the movement of a standard figure with a controllable figure, (e) circuits for indicating the final scores involving both effort and skill, and (f) circuits for resetting the operating circuit elements before the start of the next test.

The operating circuits include sources of 110 v. and 24 v. alternating current, the higher voltage being used only for operating the electric motor used in driving the figure controlled by the player. A plurality of multiple contact switches are responsive to varying conditions to be met and to the manner in which such conditions are met by the player. Such switches control a number of stepper relays for energizing circuits indicating elapsed time or the number of laps made by each figure about the track, as well as the player's errors in responding to changes in indicated conditions.

The varying conditions signals are cyclically energized by a continuous stepper relay which is notched successively for each lap made by the figures. Contacts are carried by parts associated with the two figures for intermittently energizing penalty indicating circuits, the penalty circuits energized being different dependent on which of the varying conditions has been ignored by the operator.

The scoring circuits include separate sets of contacts on the elapsed time indicating stepper relays and such separate sets of contacts are so connected that both skill and effort are integrated into a single score indication. Indications for score points up to one hundred are controlled by generally arcuate conductive segments mounted on the mechanical parts.

It will be noted that the 24 v. circuits are shown in many instances as being grounded rather than provided with return connections for completing the circuits, only one of the connections indicated as a ground, being actually grounded to the frame.

Referring to the drawings by reference numerals in which like numerals designate like parts, numeral 16 generally designates a cabinet having a bottom 17 on which the major portions of the mechanical and electrical elements and their connections are mounted. An intermediate surface having two portions 18 and 19 supports a circular track structure, indicators for varying conditions, indicators for errors made by the operator, indicators of elapsed time and indicators for the final score achieved, the surface portion 19 being at an angle to the surface portion 17 for easier visibility of all indicators. The intermediate surface 18, 19 is preferably one piece hinged to the rear end of the cabinet. The intermediate surface portion 18 has a circular cut-out to be partially filled by a circular plate 20. The inner edge of surface 18 and the outer edge of plate 20 are surrounded by annular strips 21 and 22. The plate is spaced from the edge of the one strip to provide a circular slot and the strips simulate two tracks. The track plate 20 is readily removable and replaceable when the intermediate surface 18, 19 is to be raised to afford access to the mechanism underneath.

Figure 7:
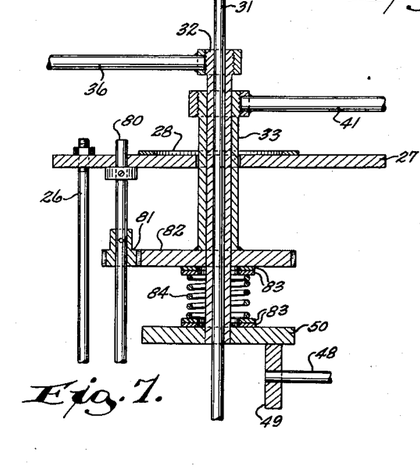
Fig. 7 is an enlarged diagrammatic view, partially in elevation and partially in section, to show the relationship of some of the mechanical parts of the device.

A frame comprising a base 25, posts 26 and a top plate 27 supported on the posts, is mounted on the cabinet bottom 17. The top plate 27 is preferably made of insulating material and has a metal slip ring 28 mounted thereon or therein concentrically with an aperture through the plate. A rod 31 extends vertically from the frame base through the aperture in the frame top plate and may be used to support the track unit 20. Concentric tubular members 32 and 33 are placed about the rod 31 (see Fig. 7) and are supported to rotate independently of and coaxially with the rod and each other. Bearings may be interposed between the rod and the member adjacent thereto and between the two members to allow such members to serve as shafts severally carrying weights at considerable horizontal distances from the axes of the shafts.

Shaft 32 has mounted adjacent its upper end an arm 36 of electrical insulating material having a vertically extending bracket 37 on which is fixed a figure 38 representing (in the first embodiment) a motorcycle and its rider. The bracket 37 extends through the slot between the edges of the track strips so that rotation of shaft 32, arm 36 and bracket 37 causes movement of figure 38, as though on a circular track, over strip 21. Shaft 33 has mounted adjacent its upper end an arm 41 of electrical insulating material with a bracket 42 extending vertically and through the slot between the track strips. A figure 43 resembling (in the first embodiment) an automobile and its driver is mounted on the bracket above the track unit so that the car appears to run on track strip 22. It will be noted that track strip 22 is marked with a transverse line and the legend "stop on red light" over which the car must pass on its movements around its track.

The cycle shaft 32 is driven at a constant speed by an electric motor 45 which is preferably of relatively slow speed and is provided with speed-reducing means such as gearing indicated at 47. The output shaft 48 of the gearing carries a disk 49 which rotates in edgewise contact with a disk 50 on cycle shaft 32. The disks 49 and 50 provide a friction transmission which will slip if either the cycle shaft 32, the cycle arm 36 or the cycle bracket 37 should jam, thus avoiding damage to such parts. It will be noted that motor 45 is adjustably mounted on slide rails 51 for adjustment of disks 49 and 50 relative to each other for varying the speed of figure 38 as may be determined to be the average ability of groups of individuals being tested.

Figure 12:
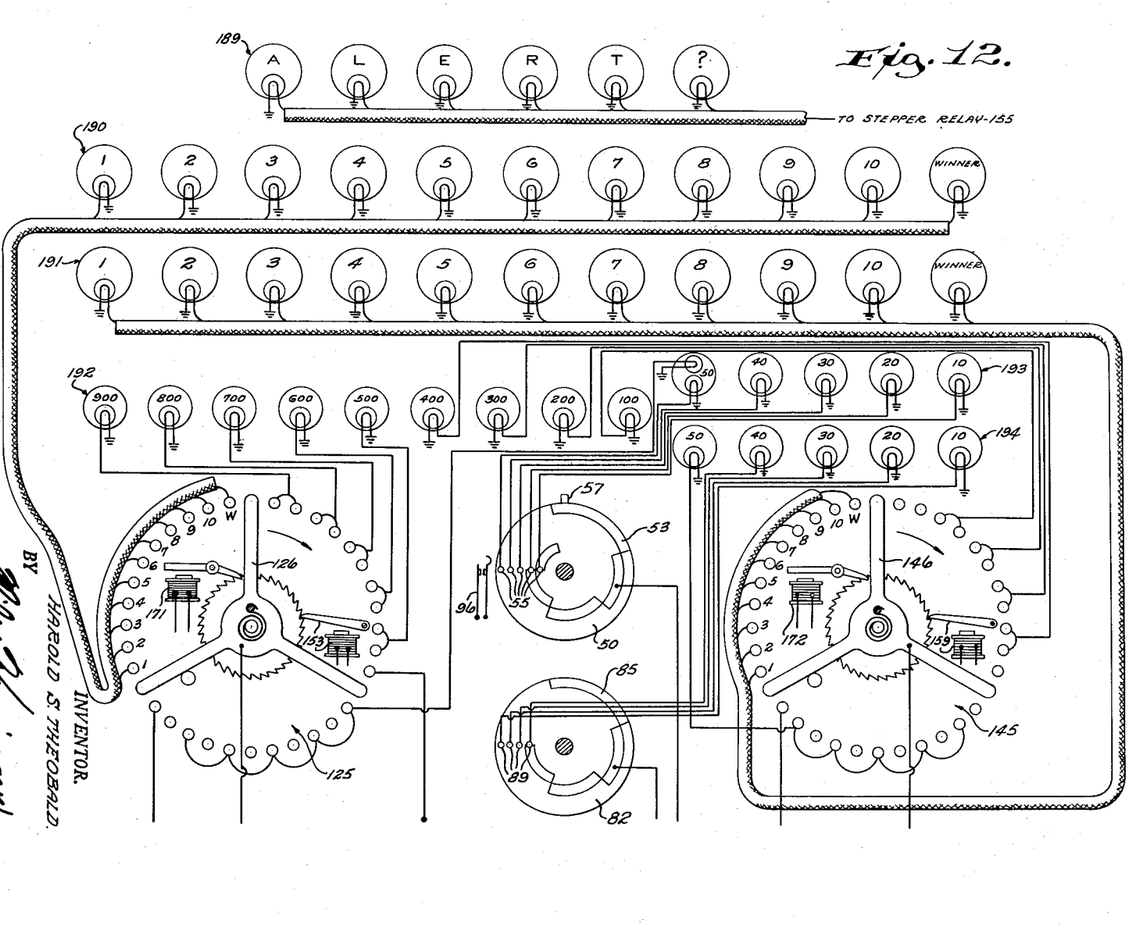
Fig. 12 is a diagram of portions of electrical circuits energizing and de-energizing lamps for comparing a constant speed or standard element of the machine with a variable speed or controlled element thereof and for indicating integration of the scoring of both the skill and effort of the operator into a single numerical value.

Disk 50 has mounted thereon a conductive layer 53 on which is placed a layer of insulation 54 with cut-out portions to expose segments of conductor 53 shaped as indicated in Fig. 12 and having the several portions thereof severally engageable with brushes 55 on a support 56 extending from the cabinet floor (see Fig. 13) and placed back of frame 25—28 to avoid interference with mechanical parts. It will be noted that disk 50 has a peripheral projection 57 therefrom for closing a switch as will be described.

Car shaft 33 is to be driven at a variable speed under the control of the operator of the device. Such control must be responsive to indications of varying conditions and in obedience to rules dependent on such conditions. The drive includes an electrical motor 58 preferably of higher speed than the cycle motor 45 and delivering power through speed-reducing means, a friction transmission device by which the output speed can be varied from zero to a maximum and means for changing the direction of power flow from the car motor to the car shaft. The speed-reducing means includes a worm 59 on the shaft of motor 58 and engaging a worm wheel 60 on a cross-shaft 61. The cross-shaft 61 carries a disk 62 for engagement with the edge of a second disk 63 mounted on a shaft 64 which is movable axially at the will of the operator. The disks 62, 63 thus provide a device to prevent any damage to parts of the machine if the parts driven through such disks should jam. The disk 63 being movable relative to the disk 62 on a radius from the center of the latter disk to adjacent the periphery thereof, the speed transmitted by way of the disks varies from zero to a maximum. The shaft 64 is rotatably mounted at one end in a link 67 which is connected to a pushrod 68 pivoted to a lever 69 which is pivoted inside a casing 70 on the forward end of the cabinet. Lever 69 moves in, and its movement is restricted by, a slot in the casing 70 so that the disk 63 cannot be moved off the disk 62 at any time.

Axially movable shaft 64 has a sprocket 73 splined or otherwise mounted on such shaft so that the sprocket may maintain substantially a given position upon axial movement of the shaft. The sprocket is connected by a chain 74 with a sprocket 75 on a cross-shaft 76 with a pulley 77 thereon. A belt 78 is twisted to run on pulley 77 and on a pulley 79 on a vertical shaft 80 so that power may flow from horizontally to the vertical shaft. A gear pinion 81 is mounted on shaft 80 and meshes with a gear 80 fixed on carshaft 33. Washer-like bearings 83 are placed on adjacent surfaces of cycle shaft disk 50 and car shaft gear 82 and a helical compression spring 84 is placed between the bearings. Both shafts 32 and 33 and the parts carried thereby thus rest on driving disk 49 and tend to maintain disks 49 and 50 in good driving contact.

Hence, as the operator changes the relationship of friction disks 62, 63 power is transmitted from the motor by way of the speed reducer, the friction transmission and the angle drive, dependent on whether disk 63 engages disk 62 at its center or between its center and periphery. Figure 38 is operated at constant speed for a given number of laps of the track and the operator of the machine races figure 43 against figure 38 while observing the three usual traffic light signals. The speed of the rotation of figure 43 must however be controlled by the operator according to the usual traffic rules governing for passing of the two figures or the passing of the figure 38 by the figure 43 as the traffic signals indicate. Thus the car may not cross the "stop" line on its track while the red light is on, and may not pass the cycle, nor may the cycle pass the car, anywhere when the yellow light shows.

Figures 4, 13, 14:
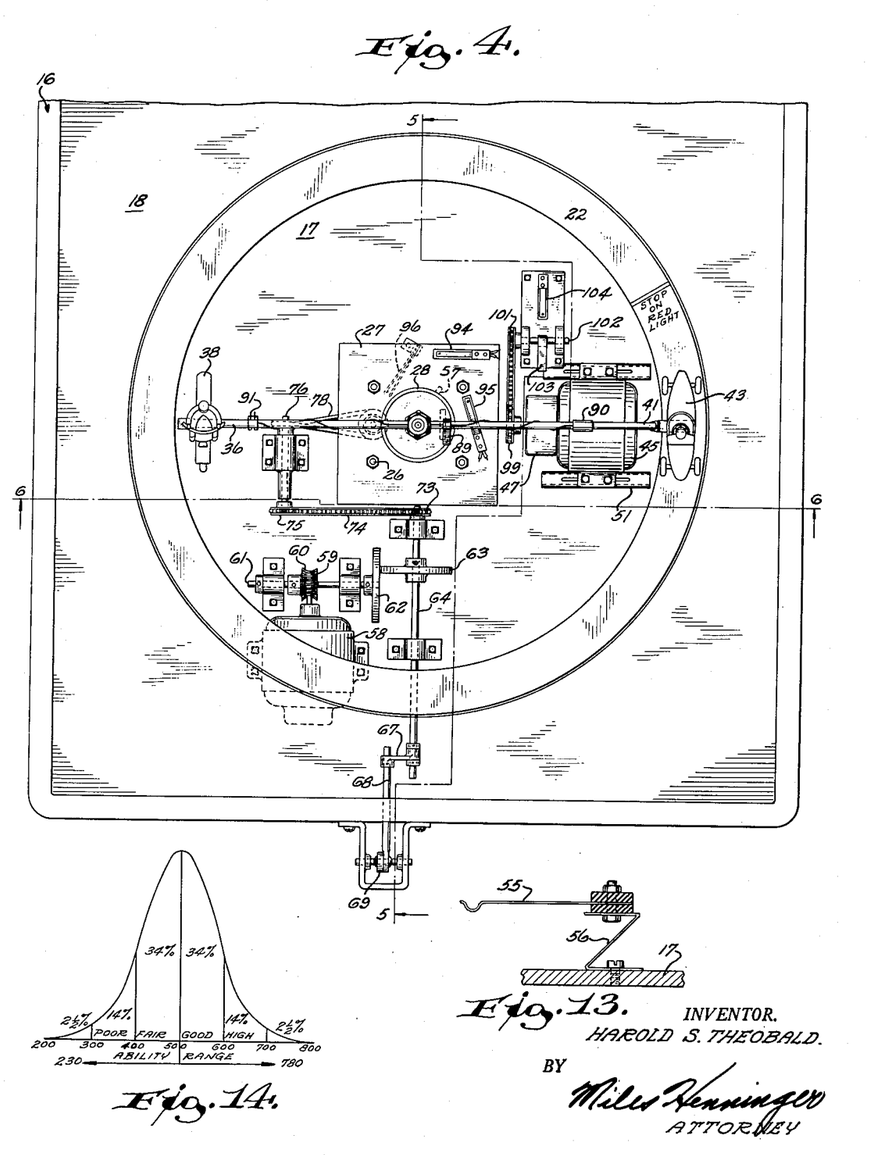
Fig. 4 is a top plan of the device of Fig. 1, after removal of surface supporting indicators for varying conditions, and for scoring errors and elapsed time indicators.
Fig. 13 is a side elevation of one of two electrical brush structures which are not shown in Figs. 4, 5 and 6 to avoid complication of such figures and which may be placed as desired.
Fig. 14 is an example of a Gaussian curve showing the manner in which scores may be compared within each ability range.
Figure 4:
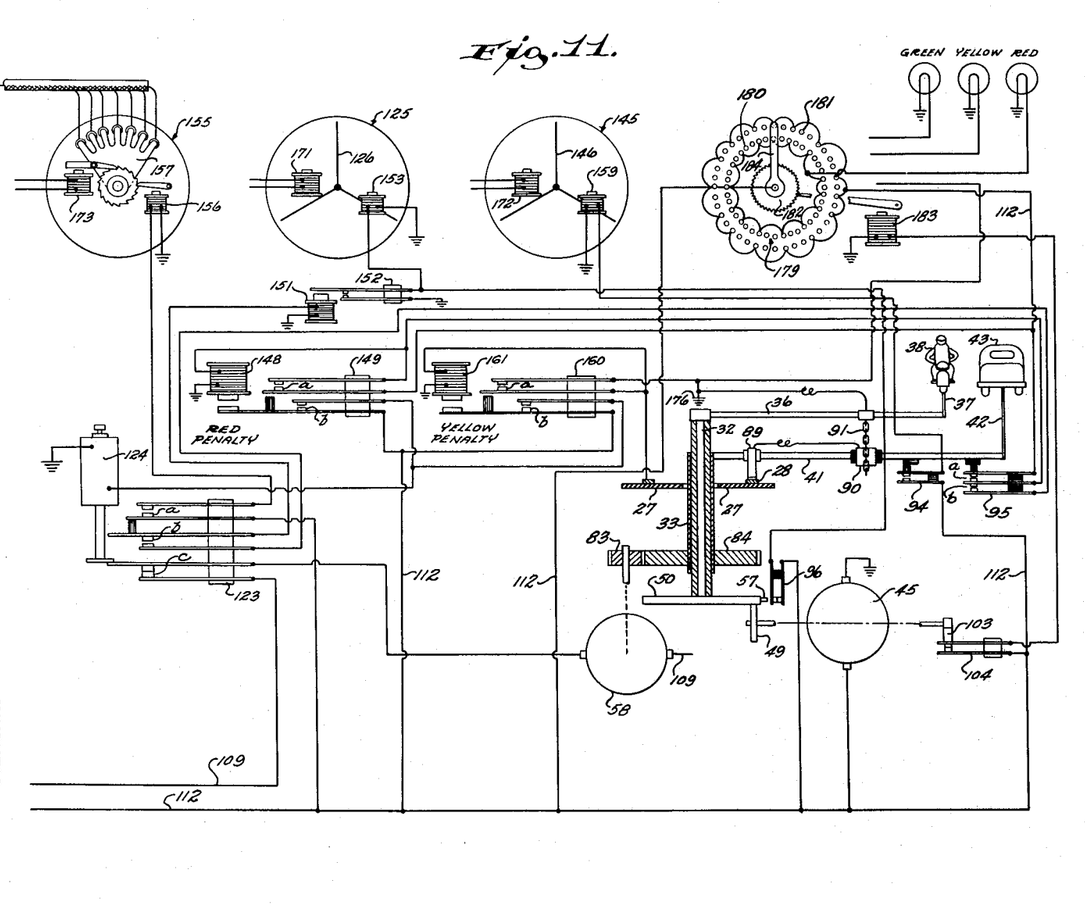
Figure 5:
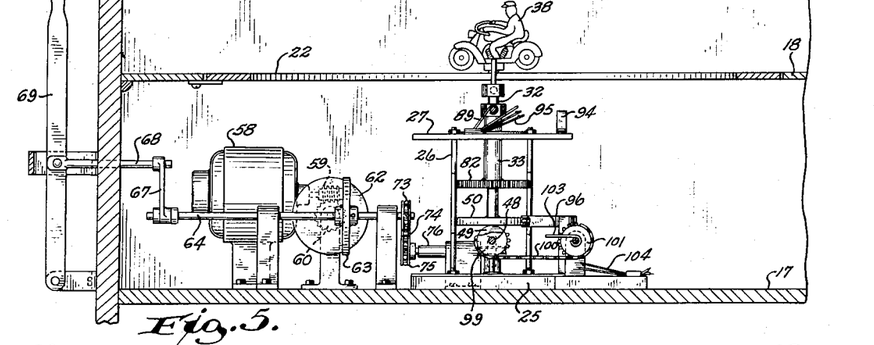
Fig. 5 is a sectional view taken on the vertical plane of line 5—5 of Fig. 4.
Figure 6:
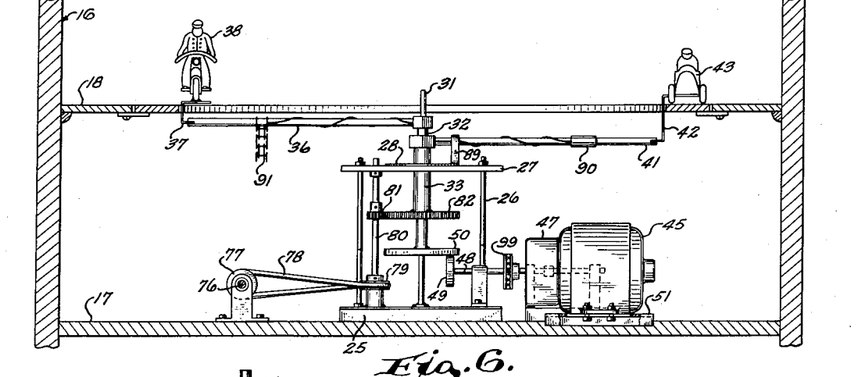
Fig. 6 is a sectional view taken on the vertical plane indicated by line 6—6 of Fig. 4.

The gear 82 has mounted thereon a disk of conductive material 85 on which is placed a sheet of insulation 86 with cut-outs to expose conductive segments shaped as shown in Fig. 12. A brush structure 89 similar to that shown in Fig. 13, is placed for several engagement of the brushes 87 with conductive segments as shown in Fig. 12.

Because the various circuits employed in the present device, have a considerable number of parts common to various circuits, other electrical elements associated with different mechanical parts, will be first described. The conductive brush 89 is mounted on car arm 41 and is electrically connected with a conductive band 90 also on such arm. A flexible contact 91 hangs from cycle arm 36 to engage with the band 90 when the figures pass each other, and such contact may complete a circuit associated with a varying condition indicator. Hence, passing of the standard figure 38 by the controlled figure 43, or vice versa, under some conditions, will register a penalty for such operation.

A pair of switches 94 and 95 are mounted on the frame top plate 27 and are normally open but are closed when the car arm 41 passes in succession over such switches, switch 95 having two sets of contacts. The switch 94 controls indication of the number of laps completed by the controlled figure. Switch 95 forms a part of the circuit for indicating penalty for errors in movement of controlled figure 43 by the operator. Switch 96 is mounted adjacent the disk 50 and is closed periodically by the projection 57 on disk 50. A sprocket 99 is mounted on the output shaft 48 of the cycle motor gearing and is connected by a chain 100 with a sprocket 101 on a shaft 102 having a crank 103 extending therefrom to close a switch 104. Switch 104 causes forward notching of a device for cyclically changing various condition indicators.

Figure 10:
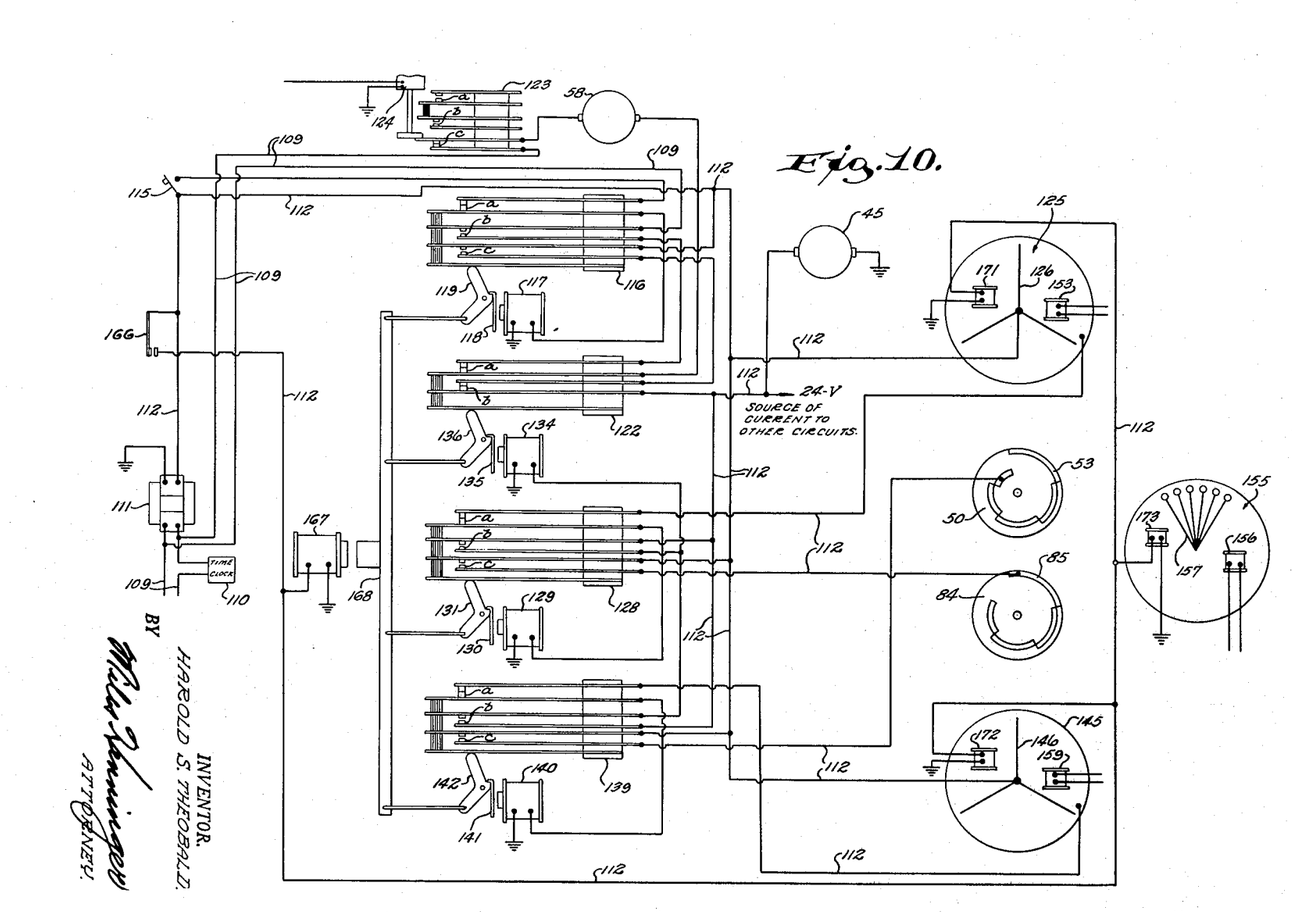
Fig. 10 is a diagram of electrical circuits utilized in testing operation of the device and by which the operating mechanism of the device may be reset from the condition at the end of one test run of the machine for beginning another test run thereof.

Referring particularly to Fig. 10 of the drawings, the diagram shows those electrical elements and connections entering into the "operating" circuit and the circuit by which the device is reset to initial position after each run, the initial or starting position being shown in the diagram. Power is supplied at 110 v. alternating current by line 109 under the control of a time switch 110 which automatically cuts off all current approximately two minutes after the last game has been played. A transformer 111 is connected with line 109 to convert some of the power to 24 v. which is distributed throughout the machine by line 112.

Although all of the electrical elements shown in Figs. 10 and 11 are well known, such elements will be briefly described to facilitate understanding of the circuits. Multiple switch 123 has sets of contacts a, b and c of which contacts b and c are normally closed by a timedelay solenoid 124. Contact *a* of such switch is normally open and is closed upon energization of solenoid 124. Multiple switches 116, 128 and 139 (see Fig. 11), each have sets of contacts *a* which are normally closed, while contacts *b* and *c* of such switches are normally open and are closed upon energization of electromagnets respectively associated with the switches for severally tripping a latch and allowing movement of a cam urged in a clockwise direction to act on the switches. Switch 122, however, has both contacts *a* and *b* normally closed and the energization of magnet 134 for tripping of latch 135 and allowing operation of cam 136, opens both sets of contacts. All of the cams of the switches 116, 122, 128 and 139 are interconnected by links to a bar 168 which is actuated by a reset solenoid 167 to return the switches to the initial position shown in Fig. 10.

Stepper relays 125 and 145 are most completely illustrated in Fig. 12 and comprise a plate having a circular series of contacts with a triple finger moving over such contacts upon operation of a ratchet by an electromagnetically actuated and spring returned pawl. The contact fingers are returned to initial position by another electromagnet and pawl structure upon resetting of the circuit. It will be understood that all the stepper fingers are severally urged to an initial position and that all the pawls are likewise urged to an initial position, as is usual and need not be shown. The connections of the various contacts of stepper relays 125 and 145 will be explained in connection with discussion of the operation of the machine.

Stepper relay 155 is generally similar to stepper relays 125 and 145 excepting that only a limited number of contacts are provided and that a number of fingers 157 equal to the number of contacts are provided to make sequential contacts thereon. Stepper relay 155 records the number of errors made in operation of the controlled figure.

In use of the machine, the "operating" circuit is energized by closure of pushbutton 115 which closes a circuit through normally closed multiple switch contacts 116a to magnet 117 for tripping latch 118 and allowing cam 119 to move clockwise which effects closing of the contacts 116b and 116c. Contacts 116b complete a circuit through normally closed switch contacts 122a to the controllable figure driving motor 58 and through normally closed contacts 123c and back to the 110 v. line 109, the dashpot solenoid 124 being de-energized at that time. Switch contacts 116c complete a circuit to contacts 122b which supplies 24 v. power to the portion of line 112, labelled "source of current to other circuits." It will be observed that motor 45 for operating standard figure 38 is energized by closure of contacts 116b. A continuous circuit is provided from the line 112 directly connected with transformer 111 to the fingers 126 of stepper relay 125, and to the fingers 144 of stepper relay 145.

The remainder of the circuits of Fig. 10 are now selectively energized dependent on whether or not the standard figure 38 first completes ten laps of the track or whether the controlled figure 43 first completes such ten laps. Assuming that the standard figure 38 first completes ten laps, the contact finger 126 of stepper relay 125 will be at the eleventh position (see Fig. 12) so that a circuit is now completed through contacts 128a to magnet 129 which trips latch 130 and allows cam 131 to swing clockwise for closing sets of contacts 128b and 128c. Closure of contacts 128b closes a circuit to magnet 134 which trips latch 135 and allows cam 136 to swing clockwise and open the normally closed contacts 122a and 122b. Closure of contacts 128c applies power to conductive segments 85 on the gear 84 as previously described.

It is now assumed that the controlled figure 43 first completes ten laps so that the contact fingers of stepper relay 145 reaches its eleventh position. (It will be understood that the action above described with relation to switch 122 and magnets 134, 135, 136 has not now taken place.) Stepper relay 145 now completes a circuit through contacts 139a to magnet 140 which trips latch 141 and allows cam 142 to turn clockwise for closing contacts 139b and 139c. Closing of contacts 139b energizes magnet 134 to open contacts 122a and 122b which interrupts the circuit of lines 109 and 112 to the controlled figure motors 58 and 45. Contacts 139c then connect conductive segments 53 on disk 50 of the standard figure drive, with the 24 v. power.

The circuits above described are returned to the initial or "re-set" position shown in Fig. 10 by closure of pushbutton 166 which completes a circuit to solenoid 167 for attracting bar 168 and rotating cams 119, 131, 136 and 142 counter-clockwise to the position at which the respective latches 118, 130, 135 and 141 may again engage. Closing of pushbutton 166 also energizes reset magnet 171 of stepper relay 125 and magnet 172 of stepper relay 145 which act on their respective pawls and cause the contact fingers of such steppers to be turned to the neutral position shown in Figs. 10 and 12. A circuit is also completed to reset magnet 173 of "error" stepper relay 155 to return the multiple contact finger thereof to the position shown in Figs. 10 and 12.

Fig. 11 shows the mechanism and circuits entering into indication of varying conditions to be observed by the operator and for indicating penalty for errors in failing to comply with the varying conditions. The circuits are shown in the initial position with only one of the indicators connected and before any errors have been made in operation.

The electrical elements shown in Fig. 11 and of which the structure has not yet been indicated, include multiple switches 149, 152 and 160 together with the holding magnets associated therewith and numbered 148 and 161. The stepper relay 125 has a magnet and pawl structure 153 by which the stepper fingers are actuated, and the stepper relay 145 has a similar magnet and pawl structure 159 by which such stepper relay is actuated in one direction.

The structure included in Fig. 11 also includes a continuous stepper relay 179 having two concentric circular rows 180 and 181 of similarly placed contacts. A ratchet 182 actuated by a magnet and pawl structure 183 moves two superimposed fingers 184 over the two rows of contacts. The contacts in each row are connected in three different variable combinations (each row similar to the other) for cyclic energization of three varying condition signals, which herein simulate traffic control lights marked with their different colors. The operating cycle of the lights need not be that normally used in standard traffic regulation. The inner row 180 of contacts will have two sets of loops making separate circuits for the red light and the yellow light, while the outer row 181 of contacts will have three sets of loops, for the green light, yellow light and red light. In Fig. 11, only one set of loops is shown on the outer row 181 with connections for the red light, the connections for the yellow light being similar to that above described for the red light and the green light being connected only with the inner row 180 of contacts.

It will be remembered that Fig. 4 of the drawing shows that the controlled figure is to be stopped when the red signal light is on. If the operator fails to stop the controlled figure short of the warning line on the track, the arm 41 for such figure presses on and closes both sets of contacts of switch 95. Closure of contacts 95a energizes holding magnet 148 which closes multiple switch contact 149a and keeps solenoid 148 energized so long as the red signal light burns. Energizing magnet 148 also closes contact 149b, completing a circuit to the dashplot solenoid 124 which lifts to close contacts 123a to allow 123b and 123c to open. Contacts 95b also complete a circuit through contacts 123b to holding magnet 151 which closes switch 152 to energize stepper relay magnet 153 and thus cause such relay to be rotated one notch which penalizes the operator one lap of the track for failing to heed the warning to stop on red light. Contacts 123a close the circuit to magnet 156 of stepper relay 155 which causes such relay to move one notch for energizing one of the lights indicating that the operator has failed to observe one of the varying conditions for playing the game. Raising of dashpot solenoid 124 allows contacts 123c to open which stops motor 58 thus bringing figure 43 to a stop until the signal lights change from the red to either yellow or green thus penalizing the player for a portion of a lap.

When the yellow or caution light is on, a connection is made from continuous stepper relay 179 to the frame (which is grounded as indicated at 176). A circuit may then be completed through flexible contact 91, conductive band 90, brush 89, slip ring 28, and magnet 161 which closes both contacts 160a and 160b. Contact 160a keeps magnet 161 energized until the signal lights change. Contact 160b completes a circuit to dashpot solenoid 124 which lifts to close contacts 123a and 123b and to open contacts 123c. (In the present situation, however, contacts 123b do not perform any function). Contact 123c interrupts the circuit to motor 58 which stops the controlled figure 43 until the light changes from yellow to red or green. The penalty is registered by way of contacts 123a which close a circuit to magnet 156 which notches the finger of stepper relay finger 157 to the next position and energizes a light showing that the caution signal has not been observed.

Figure 12 indicates the manner of showing the errors, the number of laps of both the standard (effort factor) and controlled figures (skill factor), and a numerical score. Use of the machine by a considerable number of persons shows that it is unlikely for any person to make more than seven errors in a ten-lap run at any reasonable setting of the light signal relay. In further avoidance of the appearance of testing, the errors are indicated by extinguishing lights in a bank 189 spelling "alert?", each error extinguishing one of the lights. The operation of the stepper relay finger 157 by which errors are recorded, has been above described.

Indication is to be given of the number of the lap being run by the standard figure and the control figure, by separate banks of lights respectively numbered 190 and 191. Each bank contains eleven lights numbered one to ten inclusive to show the number of the lap being run at any given time and a light marked "winner." The lights of bank 190 are severally controlled by contacts numbered one to ten, inclusive, and W on relay 125 and the lights of banks 191 are severally controlled by contacts numbered one to ten inclusive and W, to correspond to the contacts on relay 145. The operation of the lap recording relays is also discussed above and need not be repeated. It will be understood that the time or number of laps run by the controlled figure in a given period is a measurement of the effort exerted and may be used in plotting the ability of the operator on a Gaussian curve.

A numerical score is shown by light bank 192 having one light for each number scored up to nine hundred and two light banks 193, 194 each having one light for tens units up to fifty. Light banks 193, 194 coact so that any score between hundreds is shown by taking the total of the numbers illuminated in both such banks. Light bank 192 has five lights controlled by light relay 125, while the other four lights of such banks are controlled by relay 145. For each two notches of the light relay 125 from zero position of the finger thereof, one hundred is subtracted from the total score, while for the fourth, sixth, eighth and tenth notches to the right from zero of the fingers of relay 145, one hundred is added to the score.

Scores in units of tens up to a hundred are obtained by operation of disk 50 which closes switch 96 on each revolution of the disk, while the conductive segments 54 on the disk are energized. Contact is sequentially made on the various segments by a set of brushes 55, each brush controlling one light in bank 193. Disk 50 coacts with gear 84 and switch 96 by which conductive segments 85 are energized and are sequentially contacted by set of brushes 89 as the gear makes one revolution. Hence, any number between ten and ninety may be shown by totalling the lights on banks 193, 194.

Each operator starts a test with a perfect score of one thousand shown, the score being reduced as errors are made and as time elapses from the beginning of the test. For each failure to stop back of the marked position when the red light shows, a deduction of fifty points is made and it is impossible for the operator to cause movement of the controlled figure until the signal light has changed. Hence, failure to observe a red light is penalized by loss of fifty points and a fraction of a lap. If the operator exerts more than average effort, it is possible for the controlled figure to overtake and pass the standard figure a sufficient number of times so that the equivalent of several errors in "caution" may be made and yet have the controlled figure be the first to complete ten laps of the track and hence be the winner.

Referring now to Figure 14, the bell curve shown in such figure shows distribution of scores in a representative group of players having an average score of five hundred points for an average speed setting of the standard figure and a given cycle of the signal lights. It has been found that the total abilities scored will range from 230–780 with the following general divisions in the group:

2% of players, 200–300 score, "unacceptable"
14% of players, 300–400 score, "poor"
34% of players, 400–500 score, "fair"
34% of players, 500–600 score, "good"
14% of players, 600–700 score, "high"
2% of players, 700–800 score, "excellent"

It is known that through training and incentives, it is possible for most individuals to improve their normal rating by approximately 30%. Hence, the present device is useful not only for making measurements of ability but also for training to improve neuro-muscular coordination and mental application.

Figure 1:
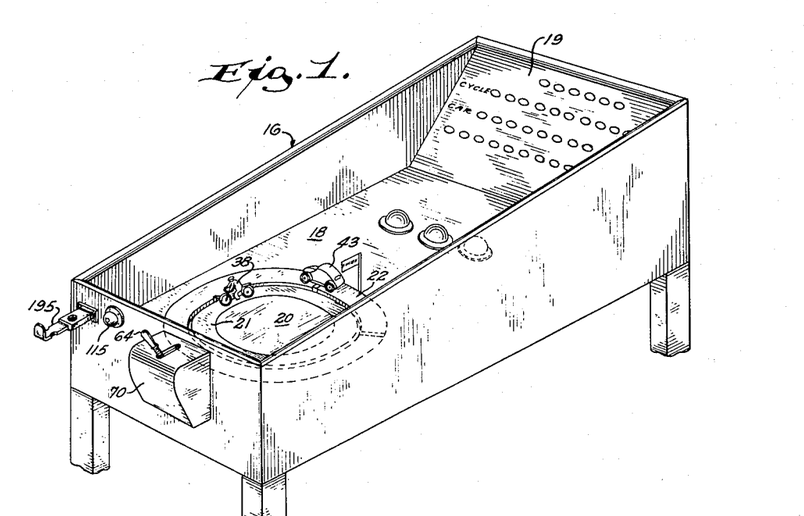
Fig. 1 is a perspective view of one embodiment of the present invention.
Figure 2:
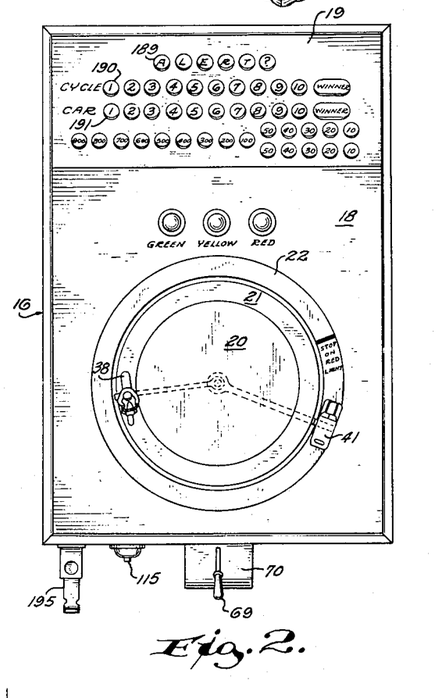
Fig. 2 is a top plan of the device shown in Fig. 1.

If the device is to be used in an amusement arcade, it is necessary only to add the usual coin-released slide indicated at 195 in Figs. 1 and 2, for operating the reset pushbutton 166. When the slide is pushed in, the coin is dropped into a suitable receptacle and the device is reset as described, the operation of the device then being exactly as previously described.

Referring to the modification shown in Fig. 3, the standard figure 38 is replaced by a horse and rider 196 with the rider carrying a simulated polo mallet to which a ball is attached. The control figure 41 is now replaced by a horse and rider 197 with a simulated polo mallet 198 by which a ball 199 may be propelled in a line defined by fences 200. The number of the chukker or period being played is indicated by the light bank 203 for the standard figure 196 and by light bank 204 for the controlled figure 197. The score obtained is shown by light bank 205 and a combination of light banks 206 and 207 as was previously described. It will be seen from the above that various games may be simulated and the controlled figure may be operated according to the rules of such games.

Although but two embodiments of the present invention have been illustrated and described, it will be apparent to those skilled in the art that various changes and modifications may be made therein without departing from the spirit of the invention or from the scope of the appended claims.

I claim:
1. In a device for testing the ability of persons to conform to given rules under varying conditions for operation of the device, a figure moving at a constant speed, a figure movable at a variable speed under control of a person being tested for speed comparison with the first said figure, a plurality of indicators for varying conditions to be observed and met by the person being tested by varying movements of the second said figure, means for automatically and selectively energizing the indicators according to a predetermined pattern, an electrical circuit for interrupting movement of the second said figure, electrical contact means severally movable with the two said figures for coaction in energizing the circuit upon passing of the first said figure by the second said figure during energization of one of the varying condition indicators, means for automatically and visually indicating failures of the person being tested to conform to the rules as made applicable by the varying conditions indicators in controlling movement of the variable speed figure, means for automatically terminating operation of the device after a given number of movements of a figure, and means for resetting the device to an initial condition.

2. In a device for testing the ability of persons to conform to given rules under varying conditions for operation of the device, a figure moving at a constant speed, means for driving the figure, the driving means being adjustable to obtain the predetermined speed, a figure movable at a variable speed under control of a person being tested for speed comparison with the first said figure, a plurality of indicators for varying conditions to be observed and met by the person being tested by varying movements of the second said figure, means for automatically and selectively energizing the indicators according to a predetermined pattern, an electrical circuit for interrupting movement of the second said figure, electrical contact means severally movable with the two said figures for coaction in energizing the circuit upon passing of the first said figure by the second said figure during energization of one of the varying condition indicators, means for automatically and visually indicating failures during operation of the device to conform to the rules as made applicable by the varying conditions indicators in controlling movement of the variable speed figure, means for automatically terminating operation of the device after a given number of movements of one figure, and means for resetting the device to an initial condition.

3. In a device for testing the ability of persons to conform to given rules under varying conditions for operation of the device, a figure moving at a constant speed, an electric motor for driving the figure, friction means transmitting power from the motor to the figure at a constant speed, the motor being adjustably mounted for changing the relationships of the friction means for adjusting the speed of the figure to the predetermined average value, a figure movable at a variable speed under control of a person being tested for speed comparison with the first said figure, a plurality of indicators for varying conditions to be observed and met by the person being tested by varying movements of the second said figure, means for automatically and selectively energizing the indicators according to a predetermined pattern, an electrical circuit for interrupting movement of the second said figure, electrical contact means severally movable with the two said figures for coaction in energizing the circuit upon passing of the first said figure by the second said figure during energization of one of the varying condition indicators, means for automatically and visually indicating failures to conform to the rules as made applicable by the varying conditions indicators in controlling movement of the variable speed figure, means for automatically terminating operation of the device after a given number of movements of one figure, and means for resetting the device to an initial condition.

4. In a device for testing the ability of persons to conform to given rules under varying conditions for operation of the device, a figure moving at a constant speed, a figure movable at a variable speed for speed comparison with the first said figure, means controllable by a person being tested for driving the second said figure at speeds different from that of the first figure, a plurality of indicators for varying conditions to be met by the person being tested by varying movements of the second said figure, means for automatically and selectively energizing the indicators according to a predetermined pattern, an electrical circuit for interrupting movement of the second said figure, electrical contact means severally movable with the two said figures for coaction in energizing the circuit upon passing of the first said figure by the second said figure during energization of one of the varying condition indicators, means for automatically and visually indicating failures of the person being tested to conform to the rules as made applicable by the varying conditions indicators in controlling movement of the variable speed figure, means for automatically terminating operation of the device after a given number of movements of one figure, and means for resetting the device to an initial condition.

5. In a device for testing the ability of persons to conform to given rules for varying conditions for operation of the device, a figure moving at a constant speed, a figure movable at a variable speed for speed comparison with the first said figure, means adjustable by the person being tested for varying the speed of the second said figure, from zero to several times that of the first figure, a plurality of indicators for varying conditions to be observed and met by a person being tested by varying movements of the second said figure, means for automatically and selectively energizing the indicators according to a predetermined pattern, an electrical circuit for interrupting movement of the second said figure, electrical contact means severally movable with the two said figures for coaction in energizing the circuit upon passing of the first said figure by the second said figure during energization of one of the varying condition indicators, means for automatically and visually indicating failures of the person being tested to conform to the rules as made applicable by the varying conditions indicators in controlling movement of the variable speed figure, means for automatically terminating operation of the device after a given number of movements of one figure, and means for resetting the device to an initial condition.

6. In a device for testing the ability of persons to conform to given rules for varying conditions for operation of the device, a figure moving at a constant speed, a figure movable at a variable speed for speed comparison with the first said figure, an electric motor for driving the second said figure, friction means for transmitting power from the motor to the second said figure under the control of the person being tested for moving the second said figure at speeds varying from zero to higher than that of the first said figure, a plurality of indicators for varying conditions to be observed and met by a person being tested by varying the speed of the second said figure, an electrical circuit for interrupting movement of the second said figure, electrical contact means severally movable with the two said figures for coaction in energizing the circuit upon passing of the first said figure by the second said figure during energization of one of the varying condition indicators, means for automatically and selectively energizing the indicators according to a predetermined pattern, means for automatically and visually indicating failures to conform to the rules as made applicable by the varying conditions indicators in controlling movement of the variable speed figure, means for automatically terminating operation of the device after a given number of movements of one figure, and means for resetting the device to an initial condition.

7. In a device for testing the ability of persons to conform to given rules for varying conditions to be met in operation of the device, a figure moving at a constant speed, a figure movable at a variable speed for speed comparison with the first said figure, adjustable means for varying the speed of the second said figure, a single lever operated by a person being tested for shifting the adjusting means to vary the speed of the second said figure from zero to higher than that of the first said figure, a plurality of indicators for varying conditions to be observed and met by the person being tested by varying movements of the second said figure, means for automatically and selectively energizing the indicators according to a predetermined pattern, an electrical circuit for interrupting movement of the second said figure, electrical contact means severally movable with the two said figures for coacting in energizing the circuit upon passing of the first said figure by the second said figure during energization of one of the varying condition indicators, means for automatically and visually indicating failures of the person being tested to conform to the rules as made applicable by the varying conditions indicators in controlling movement of the variable speed figure, means for automatically terminating operation of the device after a given number of movements of one figure, and means for resetting the device to an initial condition.

8. In a device for testing the ability of persons to conform to given rules under varying conditions to be met in operation of the device, a figure moving at a constant speed, the constant speed being determinable by the average skill of a group of persons being tested, an electric motor for driving the figure, the position of the motor being adjustable to obtain the predetermined speed therefrom, a figure movable at a variable speed, an electric motor for driving the second said figure under the control of a person being tested and at speeds varying from zero to higher than that of the first said figure, a plurality of indicators for varying conditions to be observed by the person being tested, a switch periodically closed by movement of the first said figure, a relay energized upon closure of the switch for moving in steps through a number of positions for selectively controlling energization of the indicators, means for automatically indicating failures to conform to the rules as made applicable by the indicators in controlling movement of the variable speed figure, means for automatically terminating operation of the device after a given number of movements of one figure, and means for resetting the device to an initial condition.

9. In a device for testing the ability of persons to conform to given rules under varying conditions for operation of the device, a figure moving at a constant speed, the constant speed being determinable by the average skill of a group of persons being tested, an electric motor for driving the figure, the position of the motor being adjustable to obtain the predetermined constant speed therefrom, a figure movable at a variable speed, an electric motor for driving the second said figure under the control of a person being tested and at speeds varying from zero to higher than that of the first said figure, a plurality of indicators for varying conditions to be observed and met by the person being tested, a switch closed upon each revolution of the first said figure, a relay comprising a plurality of circular rows of contacts, means for connecting the contacts of each row in given patterns, conductive fingers rotated stepwise upon each closure of the switch for closing electric circuits to the rows of contacts and sequentially energizing the indicators according to a given pattern, means for automatically indicating failures of the person being tested in conforming to the rules as made applicable by the indicators for controlling movement of the variable speed figure, means for automatically terminating operation of the device after a given number of movements of one figure, and means for resetting the device to an initial condition.

10. In a device for testing the ability of persons to conform to given rules under varying conditions for operation of the device, a figure moving at a constant speed, adjustable means for driving the figure at a predetermined speed, a figure movable at variable speed for comparison with movement of the first said figure, means for driving the second said figure at speeds varying from zero to several times that of the first said figure, a single lever for controlling transmission of power from the second said driving means to the second said figure, the lever being controllable by the person being tested, a plurality of indicators for varying conditions to be observed and met by the person being tested by varying transmission of power to the second said figure, a switch closed upon each revolution of the first said figure, a step relay energized to move sequentially from one position to another upon each closure of the switch for changing energization of the varying condition indicators, an electrical circuit for interrupting movement of the second said figure, electrical contact means severally movable with the two said figures for coaction in energizing the circuit upon passing of the first said figure by the second said figure during energization of one of the varying condition indicators, means for automatically indicating failures of the person being tested in conforming to rules applicable as shown by the varying condition indicators, means for terminating movement of the figures after a given number of movements of either figure, and means for resetting the device to an initial condition.

11. In a device for testing the ability of persons to conform to given rules under varying conditions to be met in operation of the device, a figure electrically driven at constant speed, a figure electrically driven at variable speed under the control of a person being tested for comparison in movements of the said figures, a plurality of indicators for varying conditions to be met by the person being tested by controlling movement of the second said figure, means for automatically and selectively energizing the varying condition indicators according to a predetermined pattern, an electrical circuit for interrupting movement of the second said figure, electrical contact means severally movable with the two said figures for coaction in energizing the circuit upon passing of the first said figure by the second said figure during energization of one of the varying condition indicators, means for visually indicating failure of the person being tested to conform to rules as designated by the varying condition indicators, means for terminating movement of the figures after a given number of movements of either figure, and means for resetting the device to initial condition.

12. In a device for testing the ability of persons to conform to given rules under varying conditions to be met in operation of the device, a figure electrically driven at constant speed, a figure electrically driven at variable speed under the control of a person being tested for comparison of speed and total movement with the first said figure, a plurality of indicators for varying conditions to be met by the person being tested, means adjustable to different patterns for automatically and selectively energizing the indicators, a switch closed upon movement of the first said figure, a step relay controlled by the switch for sequential closing of circuits for severally energizing the indicators, means for terminating movement of the figures after a given number of movements of either figure, and means for resetting the device to initial condition.

13. In a device for testing the ability of persons to conform to given rules under varying conditions to be met in operation of the device, a figure electrically driven at constant speed, a figure electrically driven at variable speed under the control of a person being tested for speed comparison with the first said figure, a plurality of indicators for varying conditions to be met by the person being tested by varying movements of the second said figure, means adjustable to different patterns for automatically and selectively energizing the indicators responsive to the speed of the first said figure, a plurality of switches severally closed upon movement of the first figure and upon passing of the first figure by the second figure under predetermined conditions, a step relay controlled by one of the switches for sequential closing of circuits for severally energizing the indicators, means controlled by others of the switches for indicating failure in conforming to rules designated by the indicators, means for terminating movement of the figures after a given number of movements of either figure, and means for resetting the device to initial condition.

14. In a device for testing the ability of persons to conform to given rules under varying conditions to be met in operation of the device, a figure electrically driven at constant speed, a figure electrically driven at variable speed under the control of a person being tested for speed comparison with the first said figure, a plurality of indicators for varying conditions to be met by the person being tested by varying movements of the second said figure, means for automatically and selectively energizing the indicators according to a predetermined pattern, means for indicating failure of the person being tested to conform to rules as designated by the indicators, an electric circuit for interrupting movement of the second said figure upon failure of the person being tested to conform to the rule for meeting one of the varying conditions, electric contacts severally movable with the two said figures for coaction in energizing the circuit for interrupting movement of the second said figure, means for terminating movement of the figures after a given number of movements of either figure, and means for resetting the device to initial condition.

15. In a device for testing the ability of persons to conform to given rules under varying conditions to be met in operation of the device, a first figure electrically driven at constant speed, a second figure electrically driven at variable speed under the control of a person being tested for speed comparison with the first said figure, a plurality of indicators for varying conditions to be met by the person being tested by varying movements of the second said figure, means actuated by the drive for the first figure for automatically and selectively energizing the indicators according to a predetermined pattern, means actuated by the second figure for indicating failure of the person being tested to conform to rules as designated by the indicators, means actuated jointly by both figures for interrupting movement of the second said figure upon passing of the first said figure by the second said figure and for the remainder of that rotation of the first said figure, means for terminating movement of the figures after a given number of movements of either figure, and means for resetting the device to initial condition.

16. In a device for testing the ability of persons to conform to given rules under varying conditions to be met in operation of the device, a first figure electrically driven at constant speed, a second figure electrically driven at variable speed under the control of a person being tested for speed comparison with the first said figure, a plurality of indicators for varying conditions to be met by the person being tested by varying movements of the second said figure, means for automatically and selectively energizing the indicators according to a predetermined pattern, means for indicating failure of the person being tested to conform to the rules as designated by the indicators, a switch closed by relative movement of the figures under predetermined conditions, a relay actuated stepwise by the switch to close a plurality of circuits to the failure indicating means, means for terminating movement of the figures after a given number of movements of either figure, and means for resetting the device to initial condition.

17. In a device for testing the ability of persons to conform to given rules under varying conditions to be met in operation of the device, a figure electrically driven at constant speed, a figure electrically driven at variable speed under the control of a person being tested, a plurality of indicators for varying conditions to be met by the persons being tested, means for automatically and selectively energizing the indicators according to a predetermined pattern, a plurality of switches closed by passing of the first said figure by the second said figure under a given condition, a plurality of switches held closed by closure of one of the first said switches, a relay actuated by the second said switches to move one step upon each closure of the second said switches, indicators severally energized at different positions of the relay for signalling the passing of the first figure by the second figure, means for terminating movement of the figures after a given number of movements of either figure, and means for resetting the device to an initial condition.

18. In a device for testing the ability of persons to conform to given rules under varying conditions to be met in operation of the device, a first figure electrically driven at constant speed, a second figure electrically driven at variable speed under the control of a person being tested for speed comparison with the first said figure, a plurality of indicators for varying conditions to be met by the person being tested by varying movements of the second said figure, means actuated by the drive for the first figure for automatically and selectively energizing the indicators according to a predetermined pattern, means severally actuated by the figures for terminating movement of both the figures after a given number of movements of second any one figure, means actuated jointly by the figures and solely by the second figure and coacting for indicating the difference between an initial value and the total of the number of movements of the figure and of the values assigned to failures of the person being tested in conforming to rules made applicable by the varying conditions in controlling of the second said figure, and means for resetting the device.

References Cited in the file of this patent

UNITED STATES PATENTS

| | | |
|---|---|---|
| 1,564,138 | Rowland | Dec. 1, 1925 |
| 1,992,218 | Kludas | Feb. 26, 1935 |
| 2,121,223 | Fuhrmann | June 21, 1938 |
| 2,269,444 | Durham et al. | Jan. 13, 1942 |
| 2,358,604 | Stewart | Sept. 19, 1944 |